United States Patent
Ellis

(10) Patent No.: US 8,868,023 B2
(45) Date of Patent: Oct. 21, 2014

(54) DIGITAL RADIO SYSTEMS AND METHODS

(75) Inventor: Michael D. Ellis, Boulder, CO (US)

(73) Assignee: 3D Radio LLC, Boulder, CO (US)

( * ) Notice: Subject to any disclaimer, the term of this patent is extended or adjusted under 35 U.S.C. 154(b) by 713 days.

(21) Appl. No.: 12/348,775

(22) Filed: Jan. 5, 2009

(65) Prior Publication Data

US 2009/0180579 A1    Jul. 16, 2009

Related U.S. Application Data

(60) Provisional application No. 61/019,101, filed on Jan. 4, 2008.

(51) Int. Cl.
| | |
|---|---|
| *H04B 1/16* | (2006.01) |
| *H04W 52/02* | (2009.01) |
| *H04N 21/443* | (2011.01) |
| *H04H 20/62* | (2008.01) |
| *H04N 5/44* | (2011.01) |
| *H04H 40/09* | (2008.01) |

(52) U.S. Cl.
CPC ......... *H04W 52/028* (2013.01); *H04N 21/4436* (2013.01); *Y02B 60/50* (2013.01); *Y02B 60/1278* (2013.01); *H04H 20/62* (2013.01); *H04N 5/4401* (2013.01); *H04H 40/09* (2013.01)
USPC .................. 455/343.1; 455/343.4; 455/343.5; 455/574

(58) Field of Classification Search
CPC .... Y02B 60/50; Y02B 60/1278; H04H 40/00; H04H 40/09; H04H 20/62; H04N 5/4401; H04N 21/4436; H04N 1/00891; H04N 1/00896; H04N 1/00804; H04N 1/00904
USPC ..................................... 455/574, 343.1–343.5
See application file for complete search history.

(56) References Cited

U.S. PATENT DOCUMENTS

| | | | |
|---|---|---|---|
| 2,097,901 A | 11/1937 | Thomas | 455/172.1 |
| 4,031,334 A | 6/1977 | Kimura et al. | 369/7 |
| 4,109,115 A | 8/1978 | Yamamoto | 369/7 |
| 4,268,724 A | 5/1981 | Hubbard | 369/7 |
| 4,591,661 A | 5/1986 | Benedetto et al. | 455/556.1 |
| 4,677,466 A | 6/1987 | Lert et al. | 725/22 |
| 4,682,370 A | 7/1987 | Matthews | 455/166 |
| 4,787,063 A | 11/1988 | Muguet | 386/299 |
| 4,953,212 A | 8/1990 | Otsubo | 381/1 |

(Continued)

FOREIGN PATENT DOCUMENTS

| | | |
|---|---|---|
| GB | 2 313 216 A | 11/1997 |
| WO | WO 99/45700 A1 | 9/1999 |

(Continued)

OTHER PUBLICATIONS

Non-Final Office Action mailed Dec. 27, 2010, U.S. Appl. No. 11/609,512.

(Continued)

*Primary Examiner* — Duc M Nguyen
(74) *Attorney, Agent, or Firm* — Winston & Strawn LLP

(57) ABSTRACT

A system, apparatus, method, and media directed to power control in the field of digital radio systems are provided. For example, an apparatus, method, or medium can be implemented to enter a radio into lower power mode, store radio programming with reduced functionality, and resume normal power mode.

18 Claims, 2 Drawing Sheets

(56) References Cited

U.S. PATENT DOCUMENTS

| | | | |
|---|---|---|---|
| 5,119,507 A | 6/1992 | Mankovitz | 455/154.1 |
| 5,187,589 A | 2/1993 | Kono et al. | 386/83 |
| 5,214,792 A | 5/1993 | Alwadish | 455/45 |
| 5,239,540 A | 8/1993 | Rovira et al. | 370/345 |
| 5,253,066 A | 10/1993 | Vogel | 725/28 |
| 5,345,430 A | 9/1994 | Moe | 369/7 |
| 5,371,551 A * | 12/1994 | Logan et al. | 348/571 |
| 5,406,558 A | 4/1995 | Rovira et al. | 370/326 |
| 5,448,534 A | 9/1995 | Okada | 369/7 |
| 5,457,815 A | 10/1995 | Morewitz, II | 455/161.1 |
| 5,463,599 A | 10/1995 | Yifrach et al. | 369/7 |
| 5,612,729 A | 3/1997 | Ellis et al. | 725/22 |
| 5,671,195 A | 9/1997 | Lee | 269/7 |
| 5,742,893 A | 4/1998 | Frank | 455/66.1 |
| 5,774,798 A * | 6/1998 | Gaskill | 455/186.1 |
| 5,778,137 A | 7/1998 | Nielsen et al. | 386/68 |
| 5,818,441 A | 10/1998 | Throckmorton et al. | 715/717 |
| 5,914,941 A | 6/1999 | Janky | 370/313 |
| 5,978,689 A | 11/1999 | Tuoriniemi et al. | 455/569.1 |
| 5,986,650 A | 11/1999 | Ellis et al. | 725/40 |
| 6,074,553 A | 6/2000 | Haski | 210/167.2 |
| 6,088,455 A | 7/2000 | Logan et al. | 380/200 |
| 6,134,426 A | 10/2000 | Volkel | 455/161.3 |
| 6,169,843 B1 | 1/2001 | Lenihan et al. | 386/46 |
| 6,209,787 B1 | 4/2001 | Iida | 235/381 |
| 6,212,359 B1 | 4/2001 | Knox | 725/135 |
| 6,233,389 B1 | 5/2001 | Barton et al. | 386/46 |
| 6,236,674 B1 * | 5/2001 | Morelli et al. | 375/219 |
| 6,259,441 B1 | 7/2001 | Ahmad et al. | 345/46 |
| 6,275,268 B1 | 8/2001 | Ellis et al. | 348/564 |
| 6,327,418 B1 | 12/2001 | Barton | 386/46 |
| 6,337,719 B1 * | 1/2002 | Cuccia | 348/731 |
| 6,356,704 B1 | 3/2002 | Callway et al. | 386/94 |
| 6,400,996 B1 | 6/2002 | Hoffberg et al. | 700/83 |
| 6,452,960 B1 | 9/2002 | Sato | 375/140 |
| 6,507,727 B1 | 1/2003 | Henrick | 455/3.06 |
| 6,564,003 B2 | 5/2003 | Marko et al. | 386/69 |
| 6,588,015 B1 | 7/2003 | Eyer et al. | 725/89 |
| 6,607,136 B1 | 8/2003 | Atsmon et al. | 235/492 |
| 6,630,963 B1 | 10/2003 | Billmaier | 348/485 |
| 6,658,247 B1 | 12/2003 | Saito | 455/412.1 |
| 6,710,815 B1 | 3/2004 | Billmaier et al. | 348/515 |
| 6,721,236 B1 | 4/2004 | Eschke et al. | 369/6 |
| 6,725,002 B2 | 4/2004 | Sakurai et al. | 399/111 |
| 6,725,022 B1 | 4/2004 | Clayton et al. | 455/154.1 |
| 6,769,028 B1 | 7/2004 | Sass et al. | 709/231 |
| 6,785,656 B2 | 8/2004 | Patsiokas et al. | 704/500 |
| 6,792,296 B1 | 9/2004 | Van Bosch | 455/569.2 |
| 6,829,475 B1 | 12/2004 | Lee et al. | 455/419 |
| 6,850,252 B1 | 2/2005 | Hoffberg | 715/716 |
| 6,931,451 B1 | 8/2005 | Logan et al. | 709/231 |
| 6,944,430 B2 | 9/2005 | Berstis | 455/186.1 |
| 6,952,576 B2 | 10/2005 | Fish et al. | 455/414.1 |
| 6,961,585 B2 | 11/2005 | Minematsu | 455/556.1 |
| 7,028,323 B2 | 4/2006 | Franken et al. | 725/9 |
| 7,065,342 B1 | 6/2006 | Rolf | 455/412.1 |
| 7,095,688 B2 | 8/2006 | Kondo et al. | 369/47.33 |
| 7,107,063 B1 | 9/2006 | Bates et al. | 455/456.1 |
| 7,213,075 B2 | 5/2007 | Feig | 709/231 |
| 7,231,198 B2 * | 6/2007 | Loughran | 455/343.2 |
| 7,418,277 B2 | 8/2008 | Tsai | 455/569.2 |
| 7,742,458 B2 * | 6/2010 | Sharma et al. | 370/347 |
| 7,937,119 B2 * | 5/2011 | Arai | 455/574 |
| 8,165,644 B2 * | 4/2012 | Syed | 455/574 |
| 8,411,606 B2 * | 4/2013 | Chen et al. | 370/311 |
| 2001/0047379 A1 | 11/2001 | Jun et al. | 709/1 |
| 2002/0045438 A1 | 4/2002 | Tagawa et al. | 455/412 |
| 2002/0057380 A1 | 5/2002 | Matey | 348/731 |
| 2002/0111703 A1 | 8/2002 | Cole | 700/94 |
| 2002/0174430 A1 | 11/2002 | Ellis et al. | 725/46 |
| 2002/0186957 A1 | 12/2002 | Yuen | 386/46 |
| 2003/0095791 A1 | 5/2003 | Barton et al. | 386/83 |
| 2003/0163823 A1 * | 8/2003 | Logan et al. | 725/89 |
| 2003/0208771 A1 | 11/2003 | Hensgen et al. | 725/100 |
| 2004/0128692 A1 | 7/2004 | Wolfe et al. | 725/89 |
| 2004/0158748 A1 * | 8/2004 | Ishibashi et al. | 713/300 |
| 2005/0005298 A1 | 1/2005 | Tranchina | 725/81 |
| 2005/0014495 A1 | 1/2005 | Shanahan | 455/419 |
| 2005/0020223 A1 | 1/2005 | Ellis et al. | 455/186.1 |
| 2005/0049750 A1 * | 3/2005 | Parker et al. | 700/258 |
| 2005/0229213 A1 | 10/2005 | Ellis et al. | 725/58 |
| 2006/0026637 A1 | 2/2006 | Gatto et al. | 725/37 |
| 2006/0082690 A1 * | 4/2006 | Englert | 348/731 |
| 2007/0064157 A1 * | 3/2007 | Kasamatsu | 348/730 |
| 2007/0130280 A1 | 6/2007 | Park et al. | 709/208 |
| 2008/0027586 A1 * | 1/2008 | Hern et al. | 700/284 |
| 2008/0165758 A1 * | 7/2008 | Kato et al. | 370/347 |
| 2008/0204604 A1 | 8/2008 | Campbell | 348/731 |
| 2008/0320523 A1 | 12/2008 | Morris et al. | 725/47 |

FOREIGN PATENT DOCUMENTS

| | | |
|---|---|---|
| WO | WO 99/45701 A1 | 9/1999 |
| WO | WO 99/66725 A1 | 12/1999 |
| WO | WO 00/13415 A2 | 3/2000 |
| WO | WO 00/13416 A1 | 3/2000 |
| WO | WO 00/16548 A1 | 3/2000 |
| WO | WO 00/45511 | 8/2000 |
| WO | WO 01/76248 A2 | 10/2001 |

OTHER PUBLICATIONS

Non-Final Office Action mailed Feb. 15, 2011, U.S. Appl. No. 12/033,616.

"Federal Standard 1037C Telecommunications: Glossary of Telecommunication Terms," http://www.its.bldrdoc.gov/fs-1037, Aug. 7, 1996, pp. 1-8.

Louderback, "Improve Your Commute with Audio on Demand," ZDTV, 'Online! (Nov. 1999) (available at: http://www.zdnet.com/anchordesk/story/story_4066.html).

International Search Report, application No. PCT/US02/05039, mailed Feb. 4, 2003.

* cited by examiner

DIGITAL RADIO SYSTEMS AND METHODS

CROSS-REFERENCE TO RELATED APPLICATIONS

This application claims the benefit of U.S. Provisional Patent Application No. 61/019,101, filed Jan. 4, 2008 entitled "Digital Radio Power Control Features" which is incorporated in its entirety by reference as if fully set forth herein.

This application is related to multi-tuner radio systems and methods such as those described in U.S. Pat. No. 7,171,174, U.S. Pat. No. 7,343,141, U.S. patent application Ser. No. 12/033,616, and U.S. patent Ser. No. 11/609,512, which are hereby explicitly incorporated by reference herein in their entirety such as with respect to specific implementations of such systems and methods.

BACKGROUND

Systems and methods of the invention are directed in general to towards digital radio systems, and more specifically related to multi-tuner digital radio systems such as power management for multi-tuner radio systems.

Managing power usage of multi-tuner radio systems such as portable devices or those implemented in a car can be an important consideration in providing a viable commercial product to consumers. Reducing power consumption is important for example in a car stereo while the car is turned off to minimize a car battery from draining without the car's engine running to charge the battery. It is also important for other devices, such as a battery-powered mobile device. Known existing systems are deficient in providing sufficient power control features. Automobile manufacturers are reluctant today to install any equipment that draws any power at all when the car is turned off.

SUMMARY OF THE INVENTION

According to the principles of the invention, systems and methods are described for providing features such as tools or options for radio navigation and enhanced user-interface technology.

For example, a power reduced mode can be implemented. A power reduced mode can be automatically entered when the car or mobile radio device (mobile device) is turned off. A mobile device can be configured to permit a user of the mobile device to manually control the activation of a power-saving mode. If desired, the device may be configured to automatically activate the power saving mode. A combination of manual and automatic activation also be implemented (such as to allow the user to activate the mode when listening to the radio and to also automatically activate the mode when a user turns off the device (e.g., user-interaction with the device buttons or features is unavailable unless a power is switched on)). If desired, the device may be configured to automatically determine the minimum power required at all times (e.g., to automatically reconfigure power distribution to match current requirements). The minimum power can be the power needed to provide the features requested by the user. If the device supports 8 tuners and the user has only configured 3 favorite stations, the unused tuners can be de-powered, and associated memory, processors, etc., can also be disabled and have power removed.

For example, in a multi-tuner radio device that monitors multiple stations, if some of the radio receivers are separately powered, power may be removed from one or more of the radio receivers (which consequently temporarily reduces the number of stations that are being monitored). For example, if there are eight tuners but the user has only selected four favorite stations (e.g., which would be monitored), the system may choose to remove power from the four tuners that are not actively being used. The number of stations to monitor may be user-selectable or automatically selected. In such implementations, a mobile device or system can be configured to automatically determine the number of stations to monitor, e.g., based on user inputs, and may only power the parts of the circuit required to monitor the number of stations selected. In some implementations, the user may have been permitted to assign priority levels to one or more stations, and the system may determine which stations to monitor based on the assigned priority levels when the device is in the low-power mode (e.g., a user can select which stations are "high" priority and only those stations would be monitored). Power saving mode and low power mode are used herein interchangeably.

If there are multiple memory devices that support a radio system or device, circuitry can be configured to separately power one or more of memory devices. When entering the power-saving mode, the amount of data per station may be reduced to a small number of minutes (say, reduced from 30 minutes per station to five minutes). The remaining data (e.g., five minutes per stations) may be copied to a low-power memory device (for example, SRAM instead of DRAM, or flash instead of hard disk. Or, for example, it may limit storage to a cache within the processor chip). While in the low-power mode, the system may store (e.g., only store) the smaller amount of data into the limited memory. When the low-power mode ends, the system may begin using the full complement of memory, which may involve copying data from the low-power memory device into the main memory.

While the system is in the off state, the audio output circuit may be disabled and power removed. This may include a processor for decoding the audio data, a digital-to-analog converter, amplifiers, speakers, or other circuits. One or more processors or processing devices (e.g., CPU, ASIC, etc.) (e.g., using supporting software) can be implemented to support power management features illustratively described herein such that one or more power management functions can be operating (e.g., such as when a mobile radio device is turned off). Typically devices include a power off key for turning off the device. Use of such a key results in a turn off state when the device is on.

In a system that requires multiple processors to handle the encoding of multiple stations, when the number of stations being monitored is reduced one or more processors may be left unpowered.

Any other suitable circuits may be unpowered while in the low-power state.

BRIEF DESCRIPTION OF THE DRAWINGS

Features of embodiments of the invention, its nature, and various advantages will be apparent from the following detailed description, taken in conjunction with the accompanying drawings in which.

DETAILED DESCRIPTION OF THE PREFERRED EMBODIMENTS

Figure 1:
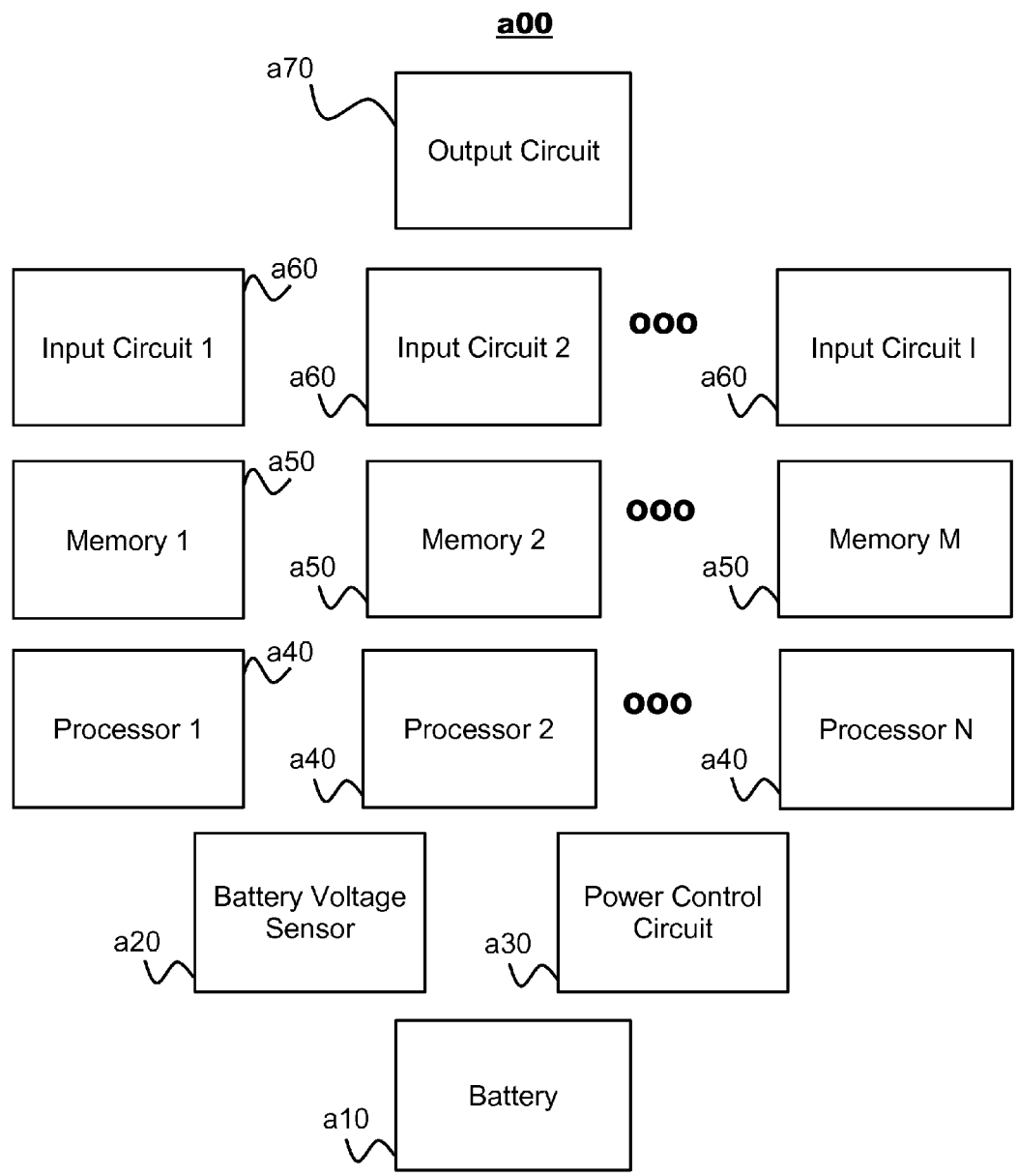
FIG. 1 illustrates a block diagram of a multi-channel radio system with power-control features in accordance with an embodiment of the invention.

FIG. 1 illustrates a block diagram of a multi-channel radio system a00 with a power-control feature. System a00 may be, for example, part of a car stereo; alternatively, it may be a hand-held portable device. System a00 receives power from battery a10. Optionally, system a00 may include battery voltage sensor a20, or another circuit for monitoring the current status of the battery and determining or estimating the amount of battery life remaining. Power control circuit a30, which may also be implemented partially in software, may use monitored information from battery voltage sensor a20, user settings, and other information to control power to various circuits within system a00.

With further reference to FIG. 1, system a00, as shown, includes one or more processors a40. In one embodiment, processor a40 provides computation control capabilities for the power control circuit a30. In particular, processors a40 provide functions related to the multi-channel radio. For example, one or more of the processors a40 may process user inputs, control radio input circuits a60 and audio output circuit a70. Processors a40 can also process, compress and decompress audio data, provide user displays, and perform a plurality of other suitable functions. Functions may be allocated in any suitable manner between processors a40. For example, one processor a40 may be used for user interactions. In another example, one processor a40 may not be capable of handling the processing of a particularly large task such as all audio input signals. In such instances, processing may be divided equally among the processors a40 (or a subset of the processors a40) through distributed processing. Processors may be of different types. For example, a general purpose microprocessor may be used for user interactions and general controls, while a number of digital signal processors may be used for processing of audio signals. Power control circuit a30 may be configured to be able to individually switch power (or apply power) to any of processors a40. Alternatively, one or more of processors a40 may be configured with a low power consumption mode that may be triggered by power control circuit a30.

System a00 includes one or more memory devices a50. Memory devices a50 may include devices of various storage capacities, power requirements, and access speeds. In addition, some of memory devices a50 may provide persistent storage in the event of the loss of power. Memory devices a50 may include dynamic random access memory (DRAM), static random access memory (SRAM), flash memory, disk memory, or any other suitable type of device. Power control circuit a30 may be configured to be able to individually switch power to each of memory devices a50. One or more of memory devices a50 may be configured to support a low-power consumption mode, for example by reducing a clock speed.

System a00 includes one or more radio input circuits a60. These circuits provide access to radio signals of any suitable type. Multiple types of radio signal may be supported. Types of radio signal may include AM radio, FM radio, digital radio, high-definition radio, satellite radio, Internet radio, Wi-Fi radio, and any other suitable type of radio signal. Radio input circuits a60 may include, for example, tuners, analog-to-digital converters, amplifiers, modulators, demodulators, encryptors, decryptors, and any other suitable type of circuit. If desired, radio input circuit a60 may be implemented partially in software. Power control circuit a30 may be configured to be able to individually switch power to each of radio input circuits a60, or to any suitable portion of these circuits.

System a00 includes audio output circuit a70. This circuit provides an audio signal that can be heard by a listener, or that can be transferred to another device. Audio output circuit a70 may include, for example, decryptors, modulators, digital-to-analog converters, amplifiers, speakers, and any other suitable device or circuit. If desired, audio output circuit a70 may be implemented partially in software. Power control circuit a30 may be configured to be able to individually switch power to audio output circuit a70, or to any suitable portion of this circuit.

Figure 2:
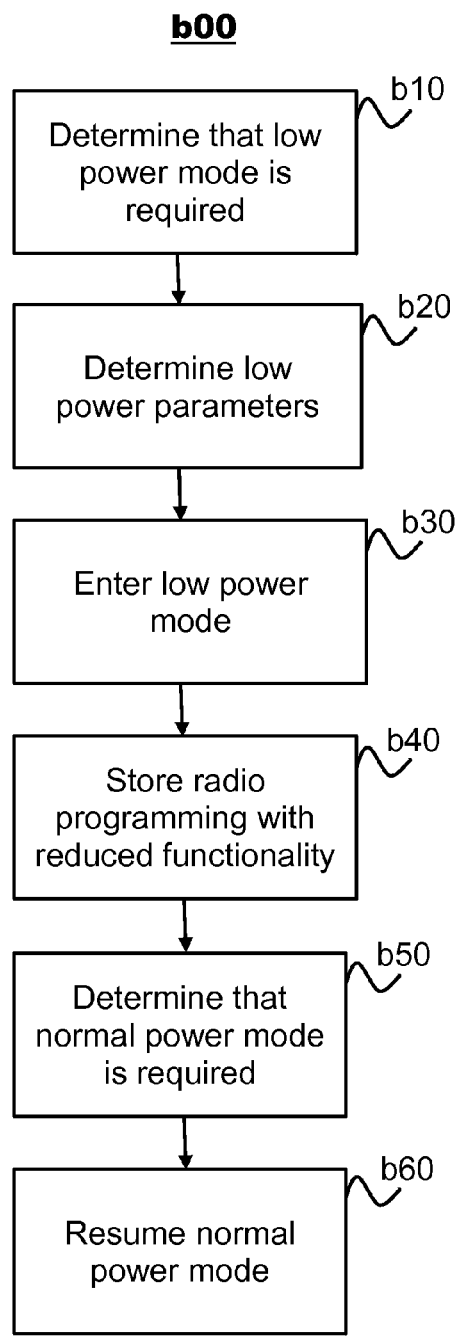
FIG. 2 shows a flow chart that illustrates power-control features in accordance with an embodiment of the invention.

FIG. 2 illustrates flow chart b00 of steps to provide power control in a multi-channel radio, in accordance with one embodiment.

In step b10, the system determines that low-power mode is required. For example, in a car stereo the user may turn off the car, thereby triggering the low-power mode. Alternatively, in a car stereo implementation, the system may determine that the car is already turned off and the current time is equal to a time configured by the user prior to when they expect to turn the car on. In particular, a user may want the radio to initiate low-power operations, (after being completely turned off), a period of time prior to his or her morning commute so that fresh radio content is available in memory at the time of the commute. For example, the system automatically turns on low power mode some period of time after the user turns off the device to buffer content shortly before an expected time when a driver is to use the car and radio. "Completely turned off" is referring to a state when a device and low power mode are turn off.

In some implementations, such as portable radios, the system may include a battery voltage sensor and may enter low-power mode when the battery voltage dips below a predetermined threshold. In some implementations, a user may be able to enter and exit low-power mode by command, such as by pressing a button. In some implementations, a system such as a portable radio device may continuously determine the minimum power needed to meet the user's needs and employ various power-saving means at any time those needs change. For example, when the user configures an additional favorite station, the radio system a00 dynamically adjusts to the real time power usage of the radio.

In step b20, the system determines the low power mode parameters. In some implementations, there may be more than one low-power level, and the parameters used may vary depending on the degree of power savings required. If the system includes a battery voltage sensor, this input may be used to determine which low power level to use.

The low power parameters may include the number of radio stations to monitor and the types of inputs to support. For example, the system may determine that reception from satellite radio stations uses more power than reception from AM and FM stations. In this embodiment, storing of data from satellite radio stations may be disabled during low power mode in favor of AM or FM stations. In another example, the user may have configured fewer favorite stations than supported by the system. In this instance, the circuits to support unused stations may be disabled (e.g., electrically disconnected by way of an open switch) in the low-power mode. In some implementations, only stations that the user has listened to recently will be monitored during low-power mode. In some implementations, the user may have designated a subset of favorite stations as power-on stations, stations for which it is important to have content available at power-on.

The low-power parameters may include the amount of memory to be used during low-power mode. In some implementations, the system may reduce the total amount of storage for each monitored station. For example, the amount of storage may be reduced from four hours per station to 30 minutes per station. In some implementations, the system may use only memory devices with lower power consumption, or may reduce power consumption on devices it continues to use.

The low-power parameters may also include use of a modified compression or encryption algorithm to reduce computation or memory needs.

In some cases, in determining the low-power parameters, the system may determine that the radio recording features should be suspended completely (e.g., such as to allow audio output without monitoring or buffering content).

After the low-power parameters are determined, the system may enter low-power mode in step b30. The parameters can for example be specified or configured when a device is installed or programmed by a user such that the existence of the parameters can be determined during the device operation in step b20. If less memory is being used or if some memory devices are being disabled, it may involve copying data from one memory device to another device. Memory structures may be updated to reflect the reduced amount of memory and the reduced number of stations. As a result, unused memory devices may be disabled and power removed therefrom.

During low-power mode, if no audio is expected to be output, such as when the car and the car stereo have been turned off, the output circuitry a70 may be disabled completely by having power removed. If the number of stations to monitor has been reduced, the input circuitry associated with the stations to ignore may be disabled and power removed. In one embodiment, input circuits may be reconfigured, for example when not all sets of input circuitry have the same capabilities.

As part of the transition to low-power mode, processing tasks may be reallocated and one or more processors may be disabled and power removed. For example, any processors used for handling input audio signals from unused stations may be disabled. If the device has been turned off and no user input is expected, processors used for user interface may be disabled as well. In such implementations power may be removed from user input and output devices and circuits as well. In some implementations, one or more processors may be put into a low-power consumption mode, in which processing power is reduced. In some implementations, the clock speed of some or all of the radio circuitry may be reduced to reduce its total power consumption.

While in low-power mode, the radio system may continue to store incoming audio signals, in step b40. This may result in reduced functionality. For example, there may be fewer stations monitored, fewer types of radio station monitored, and less memory storage allocated for audio data from each station. User features may be reduced or eliminated entirely. The audio compression algorithm used may be changed to use less processing power or less memory. For example, in some implementations the audio data may be stored uncompressed while in low-power mode. In such implementations, it may be possible to totally disable all processors and perform the data storage using a low-power DMA (direct memory access) device. In some implementations, the quality of the stored audio may be reduced while in the low-power mode (e.g., by storing fewer bits of information per second of incoming audio). In some implementations, the reduced quality may impact the user's ability to interact with the audio after exiting low-power mode. For example, the user may be allowed to listen to the stored audio, but may not be allowed to save a copy of a song recorded during this time, or to save a song that started while in low-power mode and ended in normal power mode.

In step b50, the system may determine that it should exit low-power mode and resume normal power mode to enable all of or a particular section of the device a00. In one embodiment, the system may determine that low power mode should be exited for a specific section of the device a00 for a period of time and operate in another level of power consumption, such as the full power mode. This may be achieved through disabling additional circuitry, while channeling the power towards one or more components within device a00. When the system determines it's absolutely necessary to go back to normal mode without a sustainable power source, step b50, the system a00 will attempt to warn the user that without normal power, the entire device may power off. Normal power mode may be indicated, for example, when the user starts a car with a multi-tuner radio built in. In a portable radio, normal power mode may be entered when the user charges the battery. No such warning may be provided when starting a car normally or providing an AC power input to a mobile device, as adequate power is assumed to be available for all functions of the multi-tuner radio device.

After determining that normal power mode is reentered, in step b60 the system may re-enable any circuits that have been disabled. Audio data and other information may be copied from one memory device to another. Audio input circuits may be reconfigured if they were changed on entering low-power mode. Clock speed may be restored to full speed, and all processors may be enabled and returned to normal power mode. Any functions that were reallocated between processors may be restored.

The process in FIG. 2 is an illustrative example.

System a00 and process b00 have provided multi-tuner radio systems and methods with a reduced power mode. Variations may be made to the above without departing from the spirit of the invention.

The terms radio device, system, mobile device, etc. can be used interchangeably unless the context indicates otherwise to those of ordinary skill in the art.

It should be appreciated that the embodiments therein can be implemented in numerous ways, including as a method, a circuit, a system or a device. For example, processes illustratively described herein can be implemented on computer or processor readable medium such as RAM, CD, DVD, hard drive, or other medium (in one or more locations) that can be executed or processed by a processor or computer to perform the processes.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims. Accordingly, the systems and methods described herein are not to be limited to the embodiments described herein.

What is claimed is:

1. A method for use in a digital multi-tuner radio system for power management of the radio system, comprising:
   implementing a power control circuit that controls power to various circuits within the digital multi-tuner radio system, wherein the various circuits comprises a processor;
   receiving selections of one or more features by a user while the system is switched on;
   handling incoming audio signals in connection with the selected features from one or more radio stations while in a lower power mode;
   determining minimum power needed to meet the user's need by the power control circuit while the system is in low power mode; and in response, exiting low power mode and operating in a normal power mode when the system is without normal power and while handling the incoming audio signals from the one or more radio stations.

2. The method of claim 1 comprising selectively controlling power to the processor and other selectively determined circuits.

3. The method of claim 1, comprising storing radio programming, when in the lower power mode, with reduced functionality.

4. The method of claim 1, comprising causing the radio system to enter the low power mode by putting one or more devices or circuits in the radio system into a low-power-consumption mode.

5. The method of claim 1, comprising causing the radio system to enter the low power mode by removing power from one or more devices or circuits in the radio system.

6. The method of claim 1, further comprising determining that low power mode is required by determining a time prior to a planned turn on time.

7. The method of claim 1, further comprising determining low power parameters by measuring a battery voltage.

8. The method of claim 1, further comprising determining low power parameters by determining user specified radio stations preferences or history.

9. The method of claim 1, further comprising causing the radio system to enter low power mode by reconfiguring a device or circuit.

10. The method of claim 1, further comprising causing the radio system to enter low power mode by reallocating a processing task from a first processor to a second processor.

11. The method of claim 1, further comprising causing the radio system to enter low power mode by using a lower clock speed for a device or circuit.

12. The method of claim 1, further comprising storing radio programming with reduced functionality when in lower power mode by monitoring fewer radio stations.

13. The method of claim 1, further comprising storing radio programming with reduced functionality when in lower power mode by monitoring fewer types of radio stations.

14. The method of claim 1, further comprising storing radio programming with reduced functionality when in lower power mode by using less memory.

15. The method of claim 1, further comprising storing radio programming with reduced functionality when in lower power mode by using a different compression algorithm.

16. The method of claim 1, further comprising storing radio programming with reduced functionality when in lower power mode by disabling all audio processing processors and using direct memory access to store digitized audio data.

17. The method of claim 1, further comprising storing radio programming with reduced functionality when in lower power mode by storing audio data of a lower quality.

18. The method of claim 1 further comprising disallowing one or more features using the data stored while in the low power mode after the normal power mode has been entered.

* * * * *